Oct. 25, 1932.          O. SWANSON          1,884,370
MOUNTING DEVICE
Filed Nov. 8, 1930
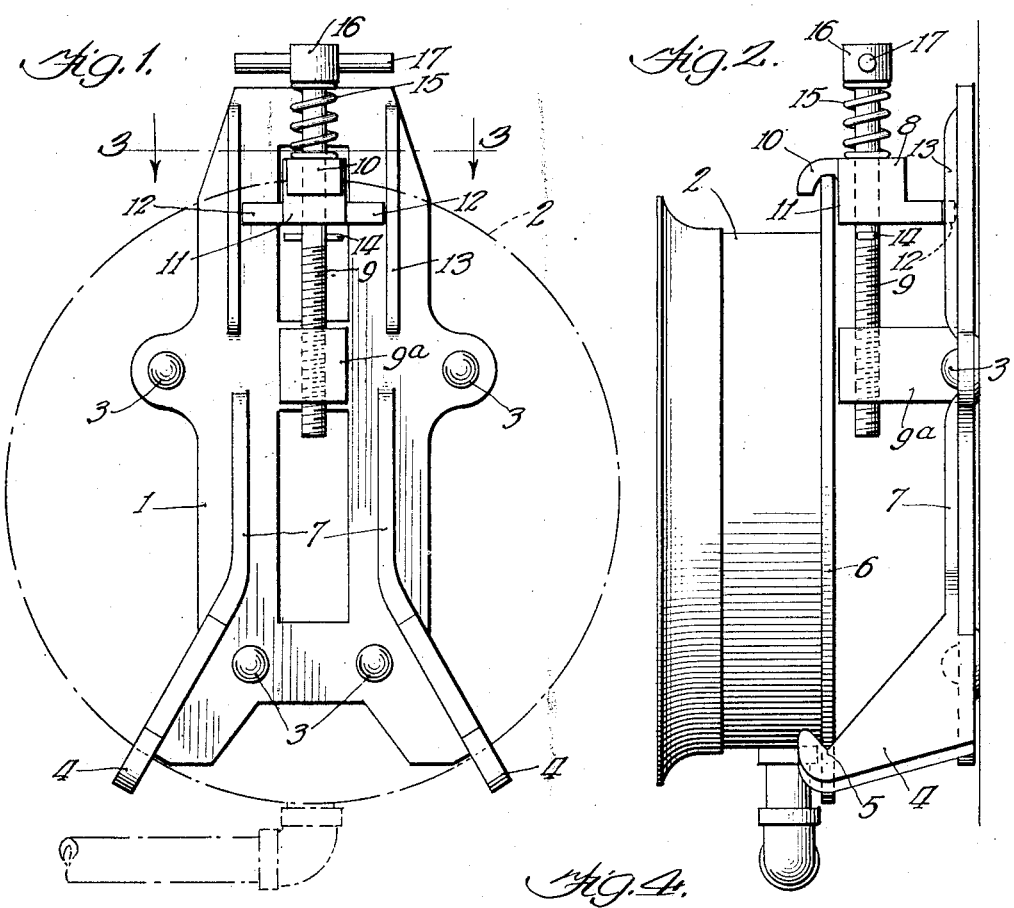
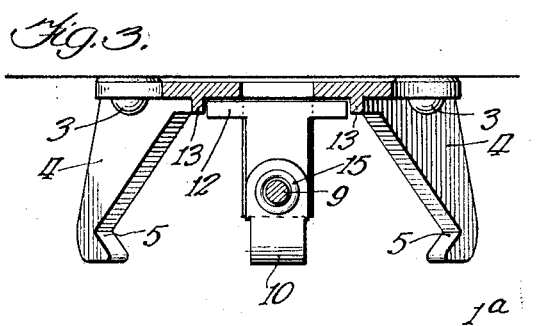
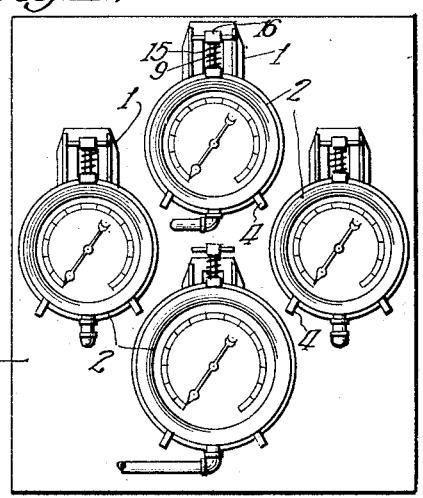
Inventor:
Olof Swanson
By Langdon Moore Atty.

Patented Oct. 25, 1932

1,884,370

UNITED STATES PATENT OFFICE

OLOF SWANSON, OF CHICAGO, ILLINOIS

MOUNTING DEVICE

Application filed November 8, 1930. Serial No. 494,260.

This invention relates to mounting devices more particularly for gauges or the like.

The invention finds particular service in connection with pressure gauge holders employed with steam power plants. On locomotives and other steam power plants for instance, it is essential that the pressure gauges employed shall correctly indicate the pressure of the steam. In order that the correctness of the gauge indications shall be beyond question, the law as well as common prudence requires that the gauge shall be removed and tested at stated intervals of about three months.

One object of this invention is to produce a gauge holder that can be permanently connected to a gauge bracket and to which the gauge can readily be applied or removed. It is a further object of this invention to produce a holder that can be employed in connection with gauges of different sizes and which will hold the gauge firmly and prevent it from loosening when subjected to vibrations.

Another object of the present invention is to provide a mounting device containing spring-pressed clamping means in which the pressure of the spring is increased by movement of the clamping means into locked position and decreased by movement in the opposite direction.

Another object is to provide a mounting device comprising clamping means so constructed that the clamping parts are mainly between the device and an object held thereby and a desirable wedging action is set up when the parts are moved into locked position.

Another object is to provide for ample air space between a gauge and a gauge bracket.

Still another object is to provide a compact but efficient structure which will take up as little room as possible upon the gauge bracket.

These and other objects are accomplished by means of the illustrative embodiment of the invention shown in the accompanying drawing, in which—

Fig. 1 is a plan view of my improved holder, showing in broken lines, the outlines of a gauge as applied thereto;

Fig. 2 is a side elevation of the improved holder with a gauge held in place thereby;

Fig. 3 is a section taken on the line 3—3 of Fig. 1;

Fig. 4 shows a group of gauges held in place by my improved holders and assembled upon a gauge bracket.

Referring to the figures of the drawing, I have shown, in general, a holder 1 adapted to engage and hold securely in place a gauge or the like such as the pressure gauge 2.

The holder 1 may be mounted, for instance, upon a gauge bracket 1a as shown in Fig. 4. Rivets 3, passing through appropriately located holes in the holder, are illustrative of means for this purpose.

The holder, which is adapted to be formed largely of a single casting, is provided at its lower end with outwardly extending arms 4 adapted to engage and support a gauge or the like. In the illustrative construction, the arms 4 are notched near their extremities as at 5, in which notches the flange 6 of the gauge 2 is received. The arms 4 may be conveniently formed as continuations and outward extensions of the reinforcing ribs 7, the arms 4 diverging as they extend downwardly so as to intercept a substantial arc upon the circumference of the flange 6. Thus the face of the holder 1 does not extend below the gauge. The arms 4 are of sufficient length to hold the gauge away from the face of the holder a substantial distance, preferably of about 1½ inches, to provide for the cooling effect of an ample air space between the gauge and the gauge bracket upon which the holder may be mounted.

In association with the arms 4, I provide manually operable clamping means for holding an object securely in position. As here shown, the sliding block 8 is mounted upon the screw bolt 9, in sliding engagement therewith. The screw bolt 9 is in threaded engagement with the screw block 9a which is shown integral with the holder 1 and is arranged between the gauge and the face of the holder thus affording compactness and strength. The sliding block 8 is provided with a retaining lip 10 for engaging the flange 6 of the gauge 2 and holding the flange between it and the notches 5 of the arms 4. A three-point support for the gauge is thus sufficient. The back of the flange 6 desirably rests against the wall 11 of the block 8. The sliding block 8 has the extensions 12 which slide upon the face of the holder 1 between the reinforcing ribs 13, thus providing guiding means for the block and preventing its rotating upon the bolt 9.

Movement of the sliding block 8 upon the bolt 9 is limited in one direction by a detent shown here as the transverse pin 14 projecting through the bolt 9. Movement of the sliding block 8 in the opposite direction upon the bolt 9 is yieldingly resisted by the helical compression spring 15 which bears at one end against the sliding block 8 and at the other end against the head 16 of the bolt 9.

The screw bolt 9, which is rotatable in the sliding block 8, may be screwed in or out of the screw block 9a. A transverse pin 17 passing through the head of the bolt 9 provides a thumb-screw construction for conveniently operating the bolt manually. When the bolt 9 is screwed into the screw block 9a and the gauge is in position as shown in Fig. 2, the pressure of the spring 15 upon the sliding block 8 and consequently the pressure of the retaining lip 10 upon the flange 6 of the gauge 2 is increased. Thus the gauge may be quickly clamped in position upon the holder and the pressure with which it is held may be varied as desired. At the same time, because of the yielding resistance of the spring clamp, compensation is secured for the jarring and vibration to which this structure is subjected in use. Since the spring 15 is always under compression, when a gauge is in position, the bolt is continuously under tension and friction is maintained between the bolt and the screw block 9a which prevents accidental unscrewing of the bolt by the jarring or vibration common under service conditions.

When the bolt 9 is screwed into the screw block 9a the resistance of the flange 6 against the retaining lip 10 of the sliding block 8, tends to tilt the sliding block 8 and the bolt 9 toward the face of the holder, thus wedging the sliding block 8 between the gauge and the holder, enhancing the strength and stability of the structure when the gauge is in position. To contribute to this wedging effect, the extensions 12 of the sliding block 8 and their point of bearing on the holder 1 are desirably offset from a plane passing perpendicularly through the bolt 9 and the bearing point of the retaining lip 10 to a plane nearer the axis of the gauge. This tilting of the bolt 9 tightens the bolt upon the screw block 9a and further prevents accidental unscrewing of the bolt.

When it is desired to remove the gauge, the bolt 9 may be screwed out of the screw block 9a, upon which the pressure of the spring upon the sliding block 8 is released and by reason of the pin 14 the retaining lip 10 may be lifted clear of the flange 6.

So constructed and arranged the gauge may be clamped in position or removed by a few turns of the thumb screw bolt 9 and at the same time the gauge is held with complete security.

Since the range of movement of the sliding block 8 may be considerable, it is evident that the holder is adapted to be employed with gauges of different sizes.

Changes may be made without departing from the invention.

I claim:

1. The combination with a mountable object; of a mounting device comprising rigid supporting arms extending a substantial distance from the face of the device; a block slidable between the object and the face of the device, said block having sliding engagement with the face of the device and having a portion for retaining engagement with the periphery of an object mounted thereon; and means pressing upon the block between the object and the face of the device with the periphery of the object as a fulcrum to wedge said block therebetween.

2. A mounting device comprising, in combination, a face; a plurality of rigid supporting arms extending a substantial distance from the face for receiving the periphery of an object to be mounted; a block slidable between the face and the object said block having sliding engagement with the face and having a portion for retaining engagement with the periphery of the object upon its side opposite the supporting arms; another block fixed on the face between the object and the face and between the sliding block and the supporting arms; a manually rotatable bolt passing through the sliding block, said bolt having a head on one end and having its other end in screw engagement with the fixed block; and a coil spring surrounding the bolt between the head of the bolt and the sliding block.

3. The structure of claim 2 wherein the sliding block engages the face in a plane transverse to the bolt nearer the fixed block than a plane transverse to the bolt passing through the point of retaining engagement of the sliding block with the periphery of the object.

4. The structure of claim 2 wherein the sliding block has a mid-portion through which the bolt passes, said mid-portion having a wall against which the object may rest, and the portion for retaining engagement with the periphery of the object is in the form of a retaining lip overhanging said wall.

5. The structure of claim 2 wherein the sliding block has a mid-portion through which the bolt passes, said mid-portion having a wall against which the object may rest, and retaining lip overhanging said wall, and wherein the block has a T-shape portion extending from the said mid-portion, the head of the T having sliding engagement with the face.

In witness whereof, I hereunto subscribe my name.

OLOF SWANSON.